United States Patent [19]
Sorenson et al.

[11] 3,722,314
[45] Mar. 27, 1973

[54] FOOT PEDAL TRANSMISSION CONTROL

[75] Inventors: Charles E. Sorenson, Mount Vernon; Clyde D. Stubblefield, Evansville, both of Ind.

[73] Assignee: Hahn, Inc., Evansville, Ind.

[22] Filed: Feb. 3, 1972

[21] Appl. No.: 223,273

[52] U.S. Cl....................74/512, 74/479, 180/77 R
[51] Int. Cl. .............................................G05g 1/14
[58] Field of Search.......74/512, 474, 479; 180/66 R, 180/77 R

[56] References Cited

UNITED STATES PATENTS

| | | | |
|---|---|---|---|
| 1,392,159 | 9/1921 | Hicks | 74/512 X |
| 3,241,394 | 3/1966 | Rubenstein | 74/512 |

*Primary Examiner*—Charles J. Myhre
*Assistant Examiner*—F. D. Shoemaker
*Attorney*—William R. Coffey et al.

[57] ABSTRACT

A control for a vehicle driven through a hydrostatic transmission including a control member having selectable positions for controlling the flow of fluid to achieve forward, reverse and neutral positions, and to govern the speed of the vehicle, and with the neutral position of the control member being intermediate its forward and reverse positions. The control includes a trunnion on the vehicle spaced apart from the control member with first and second pedals mounted on the trunnion for pivotal movement, the pedals providing first and second lever portions respectively extending upwardly and downwardly from the trunnion. The lever portions are connected to the control member by a forked link providing a pair of branches having spaced apart distal ends, one distal end being pivotally connected to one lever portion and the other distal end being pivotally connected to the other lever portion. The branches are springlike in nature such that their distal ends can flex relative to each other when the pedals are depressed. Springs act upon the link yieldably to urge the control member to its neutral position.

11 Claims, 3 Drawing Figures

PATENTED MAR 27 1973 3,722,314

FOOT PEDAL TRANSMISSION CONTROL

This invention relates to vehicle drive systems, and more particularly to the provision of a control system for a hydrostatic transmission of the type commonly used on mowers, garden tractors and other such small utility vehicles. The invention, however, is not limited to any particular type of vehicle.

BACKGROUND OF THE INVENTION

The use of a hydrostatic transmission drivingly to connect the driving axle of a vehicle to an engine is quite common. Such transmissions are conventional and commercially available. Such transmissions are conventionally provided with a rotatable control member having selectable positions for controlling the flow of fluid to achieve forward, reverse and neutral positions, and to govern the speed of the vehicle. The neutral position of the control member is intermediate its forward and reverse positions.

Various complicated systems have been proposed and constructed for controlling the movement of the vehicle by positioning the control member. One such system is shown in U.S. Pat. No. 3,541,878.

It is a primary object of the present invention, therefore, to provide a simple and inexpensive, yet very effective means for controlling such a hydrostatic transmission. The control of the present invention is much less complicated than, for instance, the control disclosed in the aforesaid U. S. Pat. No. 3,541,878.

Hydrostatic transmissions are, as pointed out above, often used on mowers and tractors which are relatively dangerous vehicles. Thus, for safety reasons, the control for such a hydrostatic transmission should be constructed such that one pedal is depressed to move the vehicle forwardly while another physically spaced apart pedal is depressed to move the vehicle rearwardly. It is another object of the present invention, therefore, to provide a pedal control including laterally spaced apart pedals, one for forward and one for reverse, with the pedals both drivingly connected to a common linkage.

Other objects and features of the present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
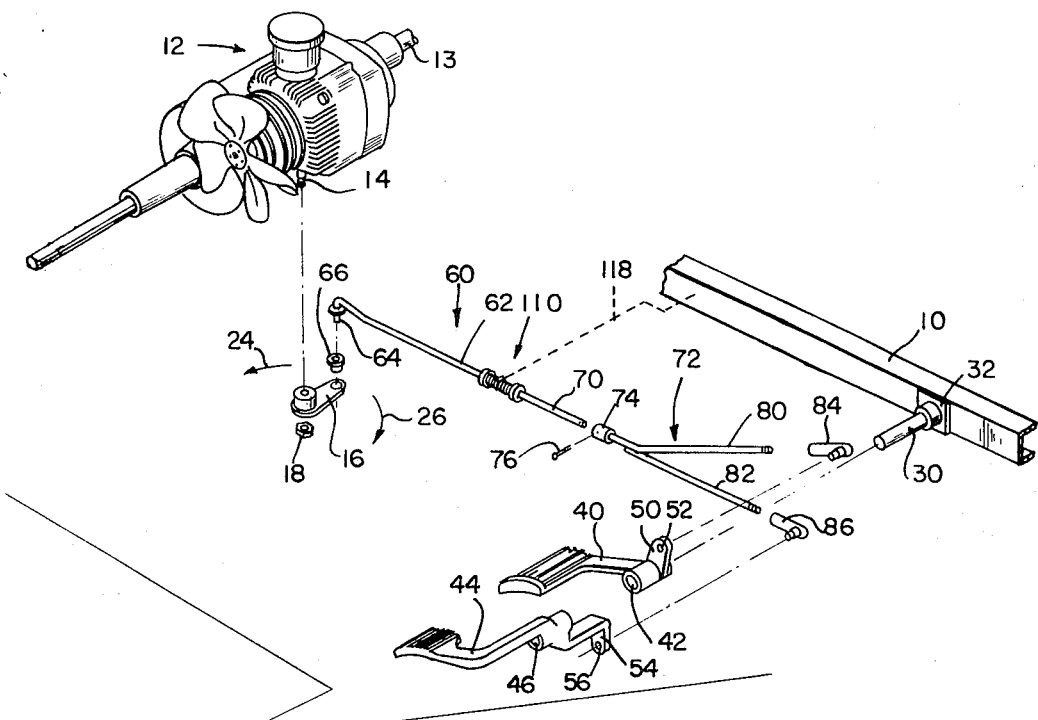
FIG. 1 is an exploded perspective view showing a conventional hydrostatic transmission, a fragment of the vehicle and the control of the present invention.

Referring now to the drawings, it will be seen that there is illustrated a fragment 10 of a vehicle and a conventional hydrostatic transmission 12 which drives an axle 13 of the vehicle. The generalities of such a transmission are disclosed in U. S. Pat. No. 3,541,878 mentioned above.

The transmission 12 conventionally includes a vertically downwardly extending and rotatable control member 14. A lever 16 is mounted on the control member and secured thereto by means such as the illustrated nut 18 with the distal end of the lever extending horizontally outwardly from the control member.

When the lever 16 and the control member 14 are driven in the direction of the arrow 24, the vehicle moves forwardly and when the lever 16 and control member 14 are driven in the direction of the arrow 26, the vehicle moves rearwardly. The neutral position of the control member 14 is intermediate its forward and reverse positions. The forward and reverse speed of the vehicle depends upon the displacement of lever 16, respectively, in the directions of the arrows 24, 26.

Means on the vehicle provides a generally horizontally extending pivot axis for the pedals of the present invention, the illustrative means being a horizontally outwardly extending trunnion 30 which is connected to the frame fragment 10 by a block indicated at 32. A forward motion pedal 40 is formed with a horizontally extending sleeve portion 42 which is journal mounted on the axially inner end portion of the trunnion 30 and a reverse motion pedal 44 is formed with such a sleeve portion 46 which is journal mounted on the axially outer end portion of the trunnion. The first mentioned pedal 40 provides a rigid and upwardly extending first lever portion 50, the distal end of which is provided with an opening 52 while the second mentioned pedal 44 is provided with a rigid and downwardly extending second lever portion 54, the distal end of which is provided with an opening 56. It will be seen that the pedal 44 is formed in such a manner that its lever portion 54 is carried on a lower, axially inwardly extending portion of the pedal such that the lever portion 54 is disposed generally in a common vertical plane with the lever portion 50, that plane being perpendicular to the axis of the trunnion 30.

The two lever portions 50, 54 are drivingly connected to the lever 16 by link means indicated at 60, the rearward portion 62 of which is turned down as indicated at 64 to be received in an aperture at the distal end of the lever 16. In the illustrative embodiment, a fitting or bearing 66 receives the downturned portion 64, the bearing being received in the aperture at the distal end of the lever 16. The forward end 70 of the link portion 62 is connected to a forked link 72 by means of a coupling 74 and a pin 76. The forked link 72 provides a pair of branches 80, 82 having spaced apart distal ends. Means such as the connector 84 is provided for pivotally connecting the distal end of the branch 80 to the lever portion 50 while means such as the connector 86 is provided for pivotally connecting the distal end of the branch 82 to the lever portion 84. The illustrative connectors 84, 86 are threaded respectively on the distal ends of the branches 80, 82, each connector providing a trunnion extending in a direction parallel to the axis of the trunnion 30. The trunnion of the connector 84 is received in the opening 52 while the trunnion of the connector 86 is received in the opening 56.

It will be appreciated that, when the pedal 40 is depressed, the lever portion 50 moves counterclockwise (FIG. 2) about the axis of the trunnion 30 in the direction of the arrow 100 to shift the link means 60 rearwardly in the direction of the arrow 102 to pivot the lever 16 in the direction of the arrow 24. Conversely, when the pedal 44 is depressed, the lever portion 54 moves counterclockwise in the direction of the arrow 106 about the axis of the trunnion 30 to shift the link means 60 forwardly in the direction of the arrow 108 to pivot the lever 16 in the direction of the arrow 26.

Figure 2:
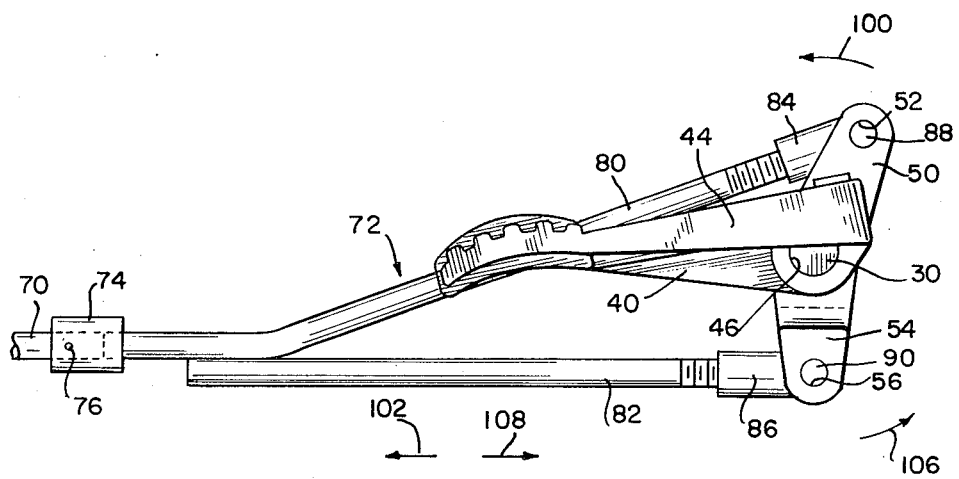
FIG. 2 is an enlarged elevational view of the pedals and the trunnion on which the pedals are mounted looking axially inwardly at the trunnion.
Figure 3:
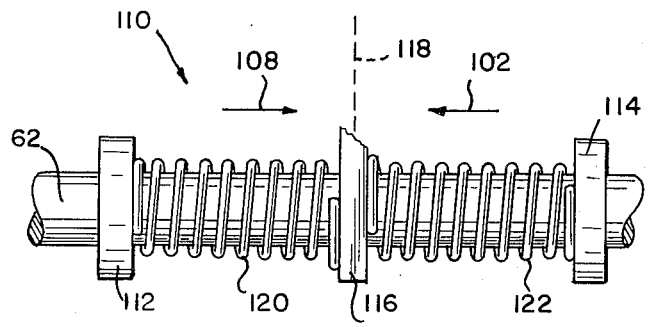
FIG. 3 is an enlarged fragmentary view of the spring means which urges the control member of the transmission to its neutral position.

The forked link 72 is fabricated from metal rod material, the branches 80, 82 being spring-like such that their distal ends can move away from each other when one of the pedals 40, 44 is depressed and move toward each other when the other of the pedals is depressed. It will be appreciated that such movement of the distal ends of the branches 80, 82 is required because the distal ends of the lever portion 50, 54 move in a circular path about the axis of the trunnion 30 while the branches 80, 82 shift forwardly and rearwardly. Referring particularly to FIG. 2, it will be seen that when the pedal 40 is depressed, and the branches 80, 82 move rearwardly, the distal ends of the branches must move away from each other. When the pedal 44 is depressed and the branches 80, 82 move forwardly, the distal ends of the branches must move closer together. It will also be appreciated that movement of the lever portion 50 counterclockwise (FIG. 2) will move the lever portion 54 clockwise while movement of the lever portion 54 counterclockwise will move the lever portion 50 clockwise. The spring-like nature of the branches 80, 82 tends to return the pedals 40, 44 to their normal positions.

The two branches 80, 82 are formed by bending one rod forming the link 72 upwardly at the angle shown in FIG. 2 and then, for instance, welding another straight rod to the bent rod as shown in FIG. 2. In the assembly of FIG. 1, the two branches 80, 82 lie in a generally vertical plane generally parallel to the said common plane of the lever portions 50, 54.

The lever 16 is urged to its neutral position, i.e., the member 14 to its neutral position, by a spring arrangement indicated generally by the reference numeral 110. The arrangement 110 includes a pair of springs acting on the link means 60, one of the springs urging the link means in one direction along its axis to urge the control member 14 away from its forward position and the other of the springs urging the link means in the opposite direction to urge the control member away from its reverse position. In the illustrative embodiment, the spring arrangement 110 includes a pair of collars 112, 114 rigidly attached to spaced apart points on the rear portion 62 of the link means and a central collar 116 disposed between the collars 112, 114 and receiving the portion 62. The central collar 116 is rigidly attached to the frame of the vehicle as indicated by the broken line connection 118 so that the link means 60 is reciprocable through the central collar. A coiled compression spring 120 is disposed between the collar 112 and the central collar 116 and another coiled compression spring 122 is disposed between the collar 114 and the central collar 116. Movement of the link means 60 rearwardly in the direction of the arrow 102 compresses the spring 122 and movement of the link means forwardly in the direction of the arrow 108 compresses the spring 120. In the equilibrium condition, with neither pedal 40, 44 depressed, the springs 120, 122 are effective to position the link means 60 such that the lever 16 is held in its neutral position.

What is claimed is:

1. In a control for a vehicle hydrostatic transmission including a control member having selectable positions for controlling the flow of fluid to achieve forward, reverse, and neutral positions, and to govern the speed of the vehicle, and with the neutral position of the control member being intermediate its forward and reverse positions, the improvement comprising means on the vehicle for defining a pivot axis, first and second pedals mounted on said vehicle for pivotal movement about said pivot axis, said first and second pedals providing first and second lever portions respectively extending outwardly from generally opposite sides of said pivot axis, link means for connecting said pedals to said control member, said link means including a link having a forked portion providing a pair of branches having spaced apart distal ends, means for pivotally connecting the distal end of one of said branches to the distal end of said first lever portion, means for pivotally connecting the distal end of the other of said branches to the distal end of said second lever portion, and means for connecting said link to said control member, and spring means for yieldingly urging said control member to its neutral position.

2. The invention of claim 1 in which said pivot axis is generally horizontally extending, said pedals being axially spaced apart on said axis, said lever portions being generally disposed in a common plane generally perpendicular to said axis.

3. The invention of claim 2 in which said control member is a generally vertically extending member rotatable about a generally vertical axis between its forward and reverse positions, said means for connecting said link to said control member including a lever having its proximal end connected to said control member and its distal end extending outwardly from said control member, and means for pivotally connecting said link to the distal end of said lever.

4. The invention of claim 3 in which said spring means includes a pair of springs acting on said link, one of said springs urging said link in one direction along its length to urge said control member away from its forward position and the other of said springs urging said link the opposite direction along its length to urge said control member away from its reverse position.

5. The invention of claim 4 including a pair of collars rigidly attached to spaced apart points on said link and a central collar disposed between said collars and receiving said link, said central collar being rigidly attached to said vehicle and said link being reciprocable therethrough, said springs being compression springs coiled about said link, one of said springs acting between one of said collars and the central collar and the other of said springs acting between the other of said collars and the central collar.

6. The invention of claim 5 in which said forked portion is fabricated from metal rod, said branches being spring-like such that their distal ends can move away from each other when one of said pedals is depressed and move toward each other when the other of said pedals is depressed.

7. The invention of claim 6 in which said link is bent upwardly at an angle to provide one of said branches and a rod is welded to said link to provide the other of said branches, said branches lying in a generally vertical plane generally parallel to the said common plane of said lever portions.

8. The invention of claim 1 in which said control member is a generally vertically extending member rotatable about a generally vertical axis between its forward and reverse positions, said means for connecting said link to said control member including a lever having its proximal end connected to said control member and its distal end extending outwardly from said control member, and means for pivotally connecting said link to the distal end of said lever.

9. The invention of claim 1 in which said spring means includes a pair of springs acting on said link, one of said springs urging said link in one direction along its length to urge said control member away from its forward position and the other of said springs urging said link the opposite direction along its length to urge said control member away from itS reverse position.

10. The invention of claim 1 in which said forked portion is fabricated from metal rod, said branches being spring-like such that their distal ends can move away from each other when one of said pedals is depressed and move toward each other when the other of said pedals is depressed.

11. In a control for a vehicle hydrostatic transmission including a control member having selectable positions for controlling the flow of fluid to achieve forward, reverse, and neutral positions, and to govern the speed of the vehicle, and with the neutral position of the control member being intermediate its forward and reverse positions, the improvement comprising means on the vehicle for defining a pivot axis, first and second pedals mounted on said vehicle for pivotal movement about said pivot axis, said first and second pedals providing first and second lever portions respectively extending outwardly from generally opposite sides of said pivot axis, link means for connecting said pedals to said control member, said link means including a link providing a pair of branches having spaced apart distal ends, means for pivotally connecting the distal end of one of said branches to the distal end of said first lever portion, means for pivotally connecting the distal end of the other of said branches to the distal end of said second lever portion, and means for connecting said link to said control member, and spring means for yieldingly urging said control member to its neutral position.

* * * * *